United States Patent
Ehrlich et al.

(10) Patent No.: US 6,718,022 B1
(45) Date of Patent: Apr. 6, 2004

(54) METHOD AND APPARATUS FOR UNIVERSAL CALL IDENTIFICATION

(75) Inventors: Jason Ehrlich, Pleasanton, CA (US); Robert Joyce, San Jose, CA (US); Steven Y. Yu, Fremont, CA (US)

(73) Assignee: Aspect Communications Corporation, San Jose, CA (US)

( * ) Notice: Subject to any disclaimer, the term of this patent is extended or adjusted under 35 U.S.C. 154(b) by 0 days.

(21) Appl. No.: 09/379,563

(22) Filed: Aug. 23, 1999

(51) Int. Cl.$^7$ .............................................. H04M 15/00
(52) U.S. Cl. .............. 379/133; 379/205.03; 379/266.1; 379/126
(58) Field of Search ............................ 379/111, 112.01, 379/112.05, 114.01, 115.01, 121.01, 121.05, 127.04, 127.05, 133–134, 126, 265.01–265.06, 266.11

(56) References Cited

U.S. PATENT DOCUMENTS

| | | | |
|---|---|---|---|
| 4,481,383 A | * | 11/1984 | Madon |
| 5,003,584 A | * | 3/1991 | Benyacar et al. |
| 5,036,535 A | * | 7/1991 | Gechter et al. |
| 5,546,455 A | | 8/1996 | Joyce et al. |
| 5,631,904 A | * | 5/1997 | Fitser et al. |
| 6,091,801 A | * | 7/2000 | Gulik |

* cited by examiner

*Primary Examiner*—Duc Nguyen
(74) *Attorney, Agent, or Firm*—Blakely Sokoloff Taylor & Zafman LLP

(57) ABSTRACT

A method and apparatus for universal call identification. One embodiment includes a method in a telephone call processing system for maintaining information about a call. The method includes creating a universal call identification for the call the call is received in the system. A call includes each of a multiple call segments that occur between a first connection of a caller resource to a call processing system resource and a disconnection of the caller resource from the call processing system. The method also includes creating a record of each of the call segments.

9 Claims, 4 Drawing Sheets

METHOD AND APPARATUS FOR UNIVERSAL CALL IDENTIFICATION

FIELD OF THE INVENTION

The present invention relates generally to the processing, storing and accessing of information within an information processing system. More particularly, the present invention relates to tracking and storing information about individual transactions for later report generation.

BACKGROUND OF THE INVENTION

Modern enterprises require the ability to collect detailed information about day to day activity such as changes in inventory, transactions with customers, and number, length and origination location of telephone calls. Any information that would aid in operation of the enterprise or future planning for the enterprise may be collected. Typically, an enterprise such as a mail order retail business or a stock brokerage uses an information processing system that collects specified information, stores it in a database, and allows a user to selectively access and arrange ("slice and dice") and retrieve the data.

One example of a commonly used information processing system is a system that processes transactions between the enterprise and those outside the enterprise. For example, various systems exist for receiving, routing, tracking and recording information about telephone calls to and from the enterprise. Particularly in the case of enterprises that do a significant amount of business by telephone with clients or customers, it is extremely useful to collect accurate information about customer telephone calls that can be easily and completely accessed at a later time and arranged into various report formats. As an example, a stock brokerage that takes orders by telephone would like to collect information about who a customer is, how much money the customer spends per time period, how long an average telephone call takes, how long a customer must wait to speak to an agent, how long an average telephone call lasts, what revenue an agent generates per time period, how many telephone calls an agent handles per time period, and so on.

Existing call processing systems typically receive calls coming into the enterprise and route them to various locations. An attempt is made to collect data about the calls, but data collection and storage capabilities of existing call processing systems have serious limitations. One limitation is the inability of the call processing system to store "call data" and "business data" related to a single call in one location where it can be easily accessed. This is because conventional call processing systems have limited ability to communicate with a computer terminal operated by a human agent taking a customer call. Typically, when a call is received by the system, the system routes the call to a human agent at a computer terminal, sometimes using information entered by the caller. The routed call is sent to the human agent and, simultaneously, the computer operated by the agent receives data from the system causing the computer to display relevant information to the agent, such as caller identity, caller buying history, etc. The agent conducts a business transaction with the caller, and at the end of the transaction, the agent is typically prompted by the computer to enter some "business data" about the transaction. The business data may include, for example, success, failure, revenue generated, stocks sold, etc. The business data is typically entered as a code or codes in predesignated fields of a record. The business data entered by the agent is typically written to a "local" database, for example, a storage device on the computer that the agent operates. "Call data", which includes information such as the duration of the call, the origin of the call, etc., is typically stored by the call processing system at the termination of the call connection. The call data is usually stored by the call processing system in a database that is local to the call processing system but remote from the agent's computer. The call processing system typically stores information about calls to many different agents in different locations.

In such prior call processing systems it is difficult or impossible to later extract coherent information about the entire customer call that includes both the business data and the call data. One of the reasons for this is current limitations in the communication link between the call processing system and the agent's computer. One prior call processing system uses a computer telephony integration (CTI) link to transmit American Standard Code for Information Interchange (ASCII) messages between the call processing system and an agent computer. Typically, control messages handling the call are sent from the call processing system to the agent computer during the call. These messages may include messages to indicate call connection and termination, or messages that cause a screen pop application to bring up relevant information on the agent's computer screen when the call is connected. The CTI link may also be used to transmit data from the agent computer to the call processing system during the call. This data may include business data related to the call that is entered by the agent during the call. Usually limited fields exist for the entry of business data by the agent. One serious limitation of the current CTI link is that it is only open when the call is actually connected. Therefore, the call may be disconnected before an agent has time to enter information about the call and transmit the information to the call processing system.

Conventional call processing systems thus have the disadvantage of allowing limited business data to be entered only in a narrow time window. Conventional call processing systems are further subject to error on the part of the agent in entering business data.

In addition to these data collection limitations, conventional call processing systems typically do not store business data and call data together so that it may be easily accessed and associated with the proper call. Most business data is not transmitted from the agent computer to the call processing system, but is stored locally with respect to the agent computer, for example, in a storage device of the agent computer. Although prior systems have limited capability to store some business data and some call data while preserving the relationship of the data to the call, retrieval is usually cumbersome. For example, it is possible to provide for an indirect linkage of stored business data and stored call data for the same call by placing matching information in a predesignated field of a record in the system database (for the call data) and a predesignated field of a record in the database external to the system (for the business data). Retrieval of the data for the single call, however, requires lookups in two databases.

Existing call processing systems have additional disadvantages related to the way in which call data is collected and stored by the system for later analysis. A "call" is typically defined in a limited way that prevents complete records about a call from being collected. For example, in the case of a call that is transferred at least once after being initially received by the system, the call is typically defined as occurring between connection and disconnection, or hang up. This definition is not very accurate or useful, because the call may have included several segments during which different resources were connected, and involved several different agents and several different periods during which a calling customer was required to "hold". It would be extremely useful to be able to identify each segment of a call and what happened during each segment in order to in order to better analyze customer needs and agent performance.

Conventional systems lack the capability of identifying every segment of a call as being part of a single call. One prior attempt to identify call segments uses a tracking number in a field of a call record. This method identifies some segments of a call, but not all possible segments of a call. As an example, when a call from a customer is connected to a first agent, a tracking number is assigned to the record created by that connection. If, however, the first agent, during the same call, calls a second agent and then connects the customer to the second agent, the segment between the customer and the second agent receives the same tracking number as the segment between the customer and the first agent, but the segment between the first agent and the second agent receives a different tracking number. Call information collected by this method may be later retrieved and analyzed to produce an inaccurate report. For example, the call duration from the customer's point of view is recorded as the time actually spent connected to the agents, while the call duration actually experienced by the customer includes the time the customer waited to be connected to the second agent. In systems that include multiple, networked call processing systems, the difficulty in collecting accurate data on all segments of a call is exacerbated. This is partly due to the fact that each call processing system may do independent data marking and storage.

SUMMARY OF THE INVENTION

A method and apparatus for universal call identification is described. One embodiment includes a telephone call processing system that includes multiple call distribution systems and an information server. Information regarding calls handled by any of the call distribution systems is collected and stored in an information server. The information server includes software and hardware to identify and store information regarding every segment of a call, even if the call is queued at multiple call distribution systems or transferred several times. One embodiment includes a method in a telephone call processing system for maintaining information about a call. The method includes creating a universal call identification for the call when the call is received in the system. A call includes each of a multiple call segments that occur between a first connection of a caller resource to a call processing system resource and a disconnection of the caller resource from the call processing system. The method also includes creating a record of each of the call segments.

DETAILED DESCRIPTION

A method and apparatus for universal call identification is described. In the following description, for the purpose of explanation, numerous specific details are set forth in order to provide a thorough understanding of the present invention. It will be evident, however, to one skilled in the art that the present invention may be practiced without these specific details.

Figure 1:
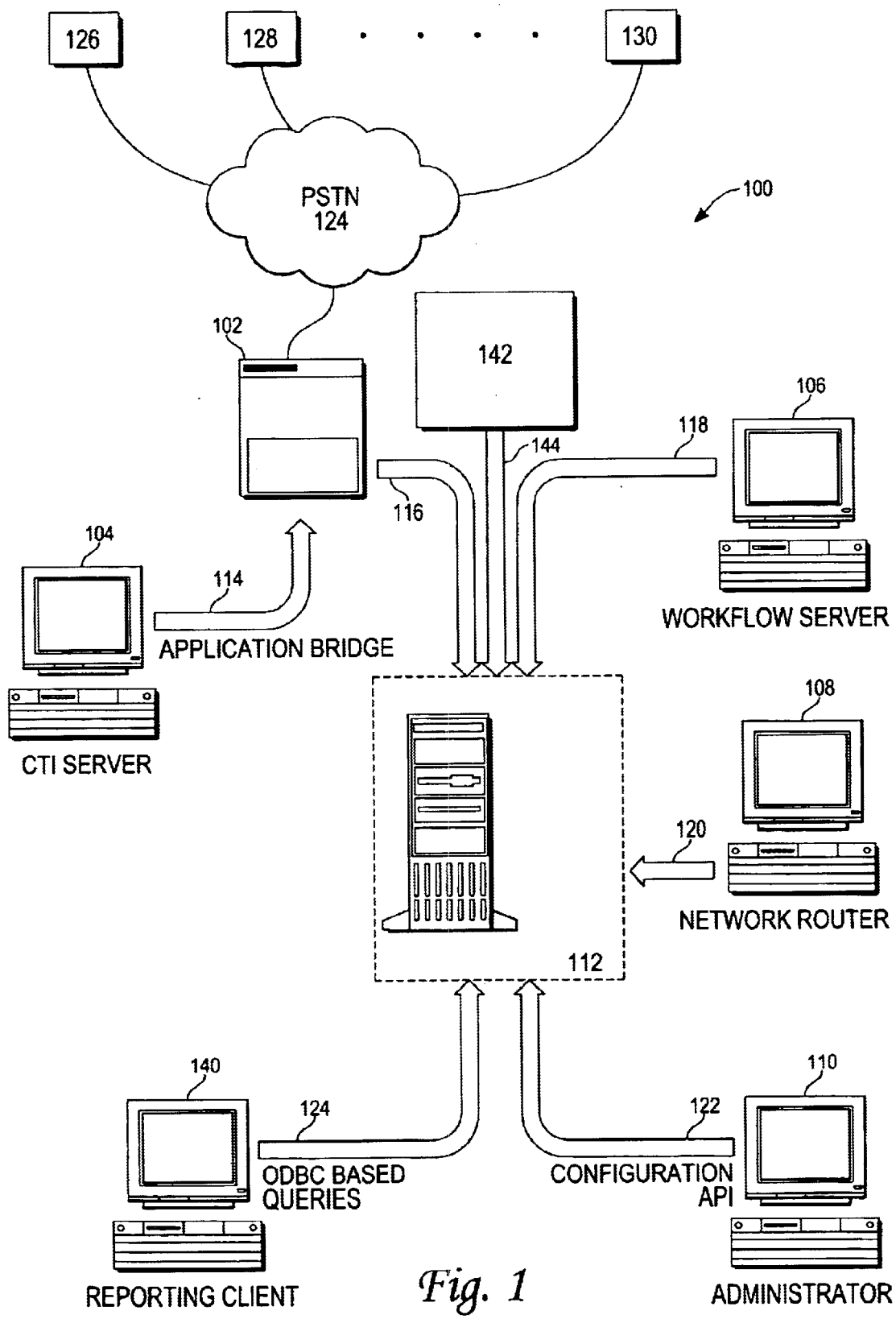
FIG. 1 is a block diagram of one embodiment of a call processing system.

FIG. 1 is a block diagram of an embodiment of a telephone call processing system 100. Call processing system 100 includes information server 112, which includes hardware and software for collecting and storing information regarding call transactions in system 100. Information server 112 collects, processes, consolidates and provides access to near-real-time and historical transaction data generated by, and pertaining to, multiple call distribution systems. As described in more detail with reference to FIG. 2, information server 112 is of the type sometimes referred to as a data mart or data warehouse. Information server 112 stores multiple gigabytes of data in a database that constitutes information (e.g., both data and metadata) regarding resource configurations, transactions and other environment parameters, conditions and functions (e.g., call, agent and trunk events, fact records and summaries). In one embodiment, the database uses a data model that is an open star schema data model suitable for querying and reporting. This data model is especially suitable for online analytical processing (OLAP) and provides many benefits compared to prior relational databases. For example, the star schema facilitates ad-hoc queries and report writing. Another benefit is that the model is extensible and allows tracking of resource configuration changes, such as a new agent using an old agent's extension. Another benefit is the ability to fully link related database records. A star schema data model is generally described by Ralph Kimball in The Data Warehouse Toolkit (John Wiley & Sons, Inc., 1996).

System 100 includes call distribution system 102, which receives and processes calls from outside system 100. Call distribution system 102 may be the Aspect® automatic call distributor (ACD) system manufactured by Aspect Telecommunications Corp. of San Jose, Calif. Processing includes routing calls and logging and storing information regarding calls. Call distribution system 102 is connected to information server 112 by data link 116. Data link 116 is a point-to-point communications link. In one embodiment, data link 116 is a transmission control protocol/internet protocol (TCP/IP) link for transmitting near-real-time data between call processing system 102 and information server 112 in, for example, a C programmatic format. Call distribution system 102 is connected to multiple telephone units 126, 128, and 130 through public switched telephone network (PSTN) 124. Call distribution system 102 receives and processes incoming calls through PSTN 124. In other embodiments, call distribution system 102 is coupled to other devices (not shown) that initiate calls into system 100. For example, call distribution system 102 may be connected to a device that initiates calls to call distribution system 102 through a different network than PSTN 124.

System 100 also includes call distribution system 142, which is coupled to information server 112 through data link 144. Call distribution system 142 is functionally similar to call distribution system 102 and processes calls from a variety of connected devices (not shown). Data link 142, in one embodiment, is identical to data link 116. Some embodiments of system 100 include only a single call distribution system such as system 102 or 142, while yet other embodiments include more than two call distribution systems.

Call distribution system 102 is connected to computer telephony interface (CTI) server 104 through application bridge 114. In one embodiment, application bridge 104 transmits American Standard Code for Information Interchange (ASCII) messages between CTI server 104 and call distribution system 102. In one embodiment, CTI server 104 is an agent device, or agent computer used by a human agent who participates in call transactions. The human agent may transmit messages regarding a current call transaction at any time during the call and also for a predetermined time after the call is disconnected. In one embodiment, call transaction information may be sent over the application bridge 104 for up to 30 seconds after a call is disconnected. In other embodiments, the time may be more than 30 seconds or less than 30 seconds.

Information server 112 is connected to reporting client 140 through link 124. Reporting client 140 may be any open database connectivity (ODBC) compliant application, and makes queries against the database of information server 112, and formats the results of these queries based on a predefined set of instructions (i.e., a report definition). The reporting client 140 may further include a method of scheduling reports to run at predetermined times.

Information server 112 is connected to administrator 110 through link 122. Administrator 110, in one embodiment, is an application that allows a user to view, configure, and control the operation of information server 112 through programming interfaces (APIs). Administrator 110 may be a Microsoft Foundation Class (MFC) 4.0 application, and could accordingly reside on a Windows 95, Windows NT workstation or Windows NT Server platform. Administrator 110 facilitates configuration and management of information server 112. For example, utilizing a graphical user interface (GUI) provided by the administrator 110, a user may define data sources, set data destinations, specify rules, formulas and frequencies for data summaries, view server system metadata information, events, and task statuses. Administrator 110 communicates with server components of information server 112 through an API that makes use of Remote Procedure Call (RPC) to facilitate remote management of information server 112.

Network router 108 is connected to information server 112 through data link 120. Data link 120 is of the same type as data link 116 and allows communication using ASCII messages in some predetermined format. Workflow server 106 is connected to information server 112 through data link 118, which is of the same type as data link 116. Data links 116, 118 and 120 allow transmission of a recoverable near-real-time data stream. In contrast to conventional systems which periodically poll a data source and store the poll results in a database, system 100 collects, arranges and stores data in near-real-time so that a user may query the database is required to extract, for example, data for the preceding hour.

In some embodiments, system 100 includes multiple call distribution centers 102. In these embodiments, data from each call distribution system 102 is collected and managed by information server 112.

Figure 2:
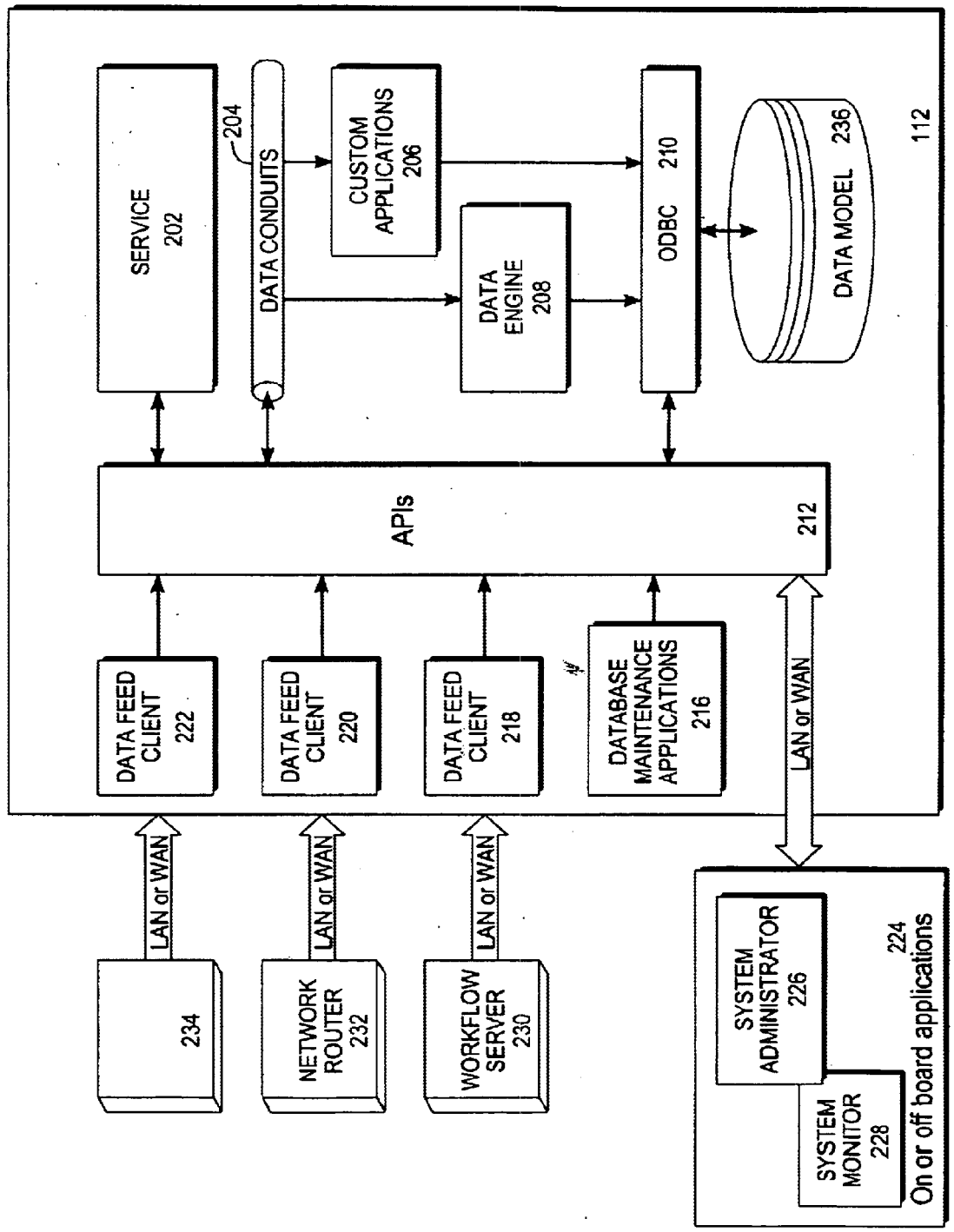
FIG. 2 is a block diagram of elements of an information server.

FIG. 2 is a block diagram of one embodiment of information server 112. Information server 112 includes data model 236, which in one embodiment, is a star schema on an Oracle database. Data engine 208 and custom applications 206 access data model 236 through ODBCs 210. Data engine 208 and custom application 206 transmit information from APIs 212 through data conduits 204. For example, data engine 208 is an information server 112 application that gathers, stores, and summarizes records received via data conduits 204. APIs 212 allow remote applications to monitor and control information server 112 and its data.

Call distribution center 234 is connected to information server 112 through a local area network (LAN) or a wide area network (WAN) and a data feed client 222. Network router 232 is connected to information server 112 through a LAN or WAN and a data feed client 220. Workflow server 230 is connected to information server 112 through a LAN or WAN and a data feed client 218.

Database maintenance applications 216 communicate with data model 236 through APIs 212. On or off board applications 224 communicate with information server 112 through a LAN or WAN and APIs 212. On or off board applications 224 include system administrator 226 and system monitor 228, which allow users to view, configure, and control the operation of information server 112. System administrator 226 and system monitor 228, in one embodiment, run on information server 112. In other embodiments, system administrator 226 and system monitor 228 run on a remote administration workstation.

Service applications 202 controls data feeds, distributes records to information server applications and manages access to information server metadata.

The data model of information server 112 implements star schemas for calls, agent and trunk events, other fact tables, and summaries. A star schema is a method of organizing data in which a central fact table contains scalar and other data, along with keys pointing to dimension tables (often referred to as dimensions) which contain descriptions of the attributes of the dimension. Fact tables are created from information sent over TCP/IP links such as links 116 and 144. Fact tables include a call segment table, an agent activity table, and a trunk activity table. Each record in the call segment table corresponds to a record in a call detail table on a call distribution system handling the call (for example, call distribution system 102).

Figure 3:
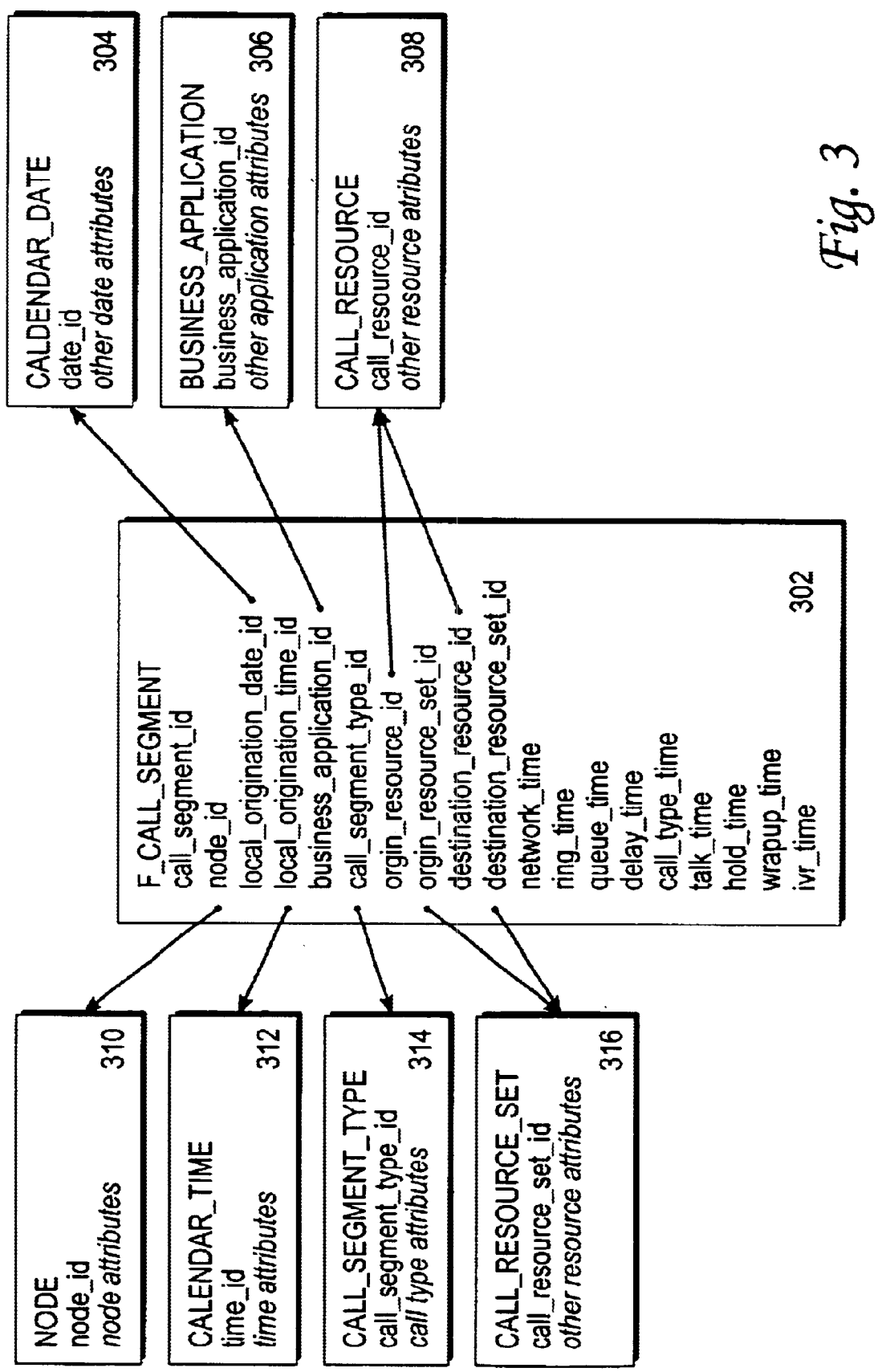
FIG. 3 is a block diagram of one embodiment of a call segment data model.

FIG. 3 is a diagram of an information server call segment fact table 302 along with some of the dimension tables that describe the call segment. Both origin_resource_id and destination_resource_id point to the call_resource dimension. Records in the call_resource dimension describe agents, trunks, auxiliary devices, and other resources that can originate or handle a call. The call_resource_set dimension describes agent groups, trunk groups, supervisor teams, and other entities that aggregate call resources. Call segment fact table 302 includes flags indicating special characteristics of the call, such as whether it was the first segment of the call, whether a customer was involved, etc.

One purpose of the call segment type submodel is to describe the nature, handling, and results of a particular call segment.

The call_segment_type table is the primary dimension table of the call segment type submodel. Every call segment record, and every summary record based on the call segment record, has a call_segment_type_id field that points to a record in the call_segment_type table.

The call segment type table includes a primary key; a set of call type fields, and a flag set. The flag set is useful for reporting, as its contents are easy to understand. Table 1 describes the contents of one embodiment of the call segment type table.

TABLE 1

| Field | Description |
| --- | --- |
| call_segment_type_id | Primary key |
| | Fields |
| call_type | Maps to call detail call_type. |
| transaction_type | Maps to call detail trans_type. |
| disposition | Maps the call detail disposition. |
| answer_detect | Answer detect code. |
| call_modifier() | Maps to call detail cflag. Usage of flag set is preferred for reporting. |
| call_modifier2 | Maps to call detail cflag2. |
| | Flag set |
| call_transfer_flag | Transfer button was pressed for this call (call transferred out). |
| conference_flag | Conference button was pressed. |
| emergency_flag | Emergency button was pressed. |
| new_transaction_flag | A New Transaction step executed. |
| inbound_network_code | Information about use of inbound network postrouting features. |
| outbound_network_code | Information about use of outbound network postrouting features. |
| | Record administration and future use |
| call_modifier1 | Maps to call detail cflag1, which is reserved for future. |
| last_update_timestamp | Date and time the record was last updated. |
| new_permutation_flag | Record was automatically generated when a call contained a combination of type information that had not previously been recorded. |
| permutation number | A unique, content-based identifier for this call segment type, generated by a hash function. |
| vendor | Vendor identifier |

Once call segments are linked, the database of information server 112 provides a single image for all the calls that occurred in the system and a user may trace call flow in any one of the call distribution systems, e.g., system 102 or system 142.

Software of information server 112 views calls in a different way from a call distribution system such as 102 because it views multiple call distribution systems. When a call comes into system 100 or is initiated from system 100, a new call is generated. If the call is transferred, re-routed, or network inter-queued, there will be multiple segments associated with the same call. To identify these call segments, each call segment is assigned a call segment id and a same universal call id. In a call fact table of information server 112, there are two fields relating to call linking, universal call id, and call segment id. Each call is assigned a call segment id when it arrives at the database of information server 112. This call segment id is unique throughout the database. The call segment id is different from call ids assigned by a call distribution system. In one embodiment, a call segment id is generated by an ORACLE sequence number generator on information server 112.

A universal call id for related call segments is chosen from one of the call segment ids. In one embodiment it is the call segment id for the first call segment that arrives at information server 112. The same universal call id is applied to each call segment in a related call.

Call distribution systems 102 and 142 each include a call detail table that includes a track_node field and track_num field. Track node is a number used to identify a particular call distribution system. Each call distribution system in system 100 has a unique track node number. This node number is different from a node id associated with information server 112 and is populated into the information server 112 database node table node_number field by a data monitor application of a call distribution system.

When a call is initiated at a call distribution system, an initial message sent over the associated TCP/IP data link from the call distribution system to information server 112 is one of three types. One type of message is an rinit message that indicates the call is a new, incoming call. The second type of message is an init message that indicates the call is a dialing call. The third type of message is an inter message that indicates that the call is a transferred call. Each message comes with a set of track_node and track_number. The combination of track_node, track_number as well as a resource id is used to relate call segments across multiple ACDs.

Call linking for the same call distribution system is primarily based on which resources handle the call. In the case of call linking for the same call distribution system a relationship is built between resources (for example, trunks and agents) and the active call associated with a particular resource. Once this relationship is established, the link is followed to get required information, for example, a universal call id. In one embodiment, the algorithm used for call linking for the came call distribution system is as shown below.

Resource xxx is available.

Resource yyy is available.

Rinit message received by call 1, call segment id 123 is assigned.

Connect message received, associate resource xxx with call 1.

Resource xxx makes an internal call 2 to resource yyy.

Init message received by call 2.

Call segment id 124 is assigned.

Does resource xxx have an active call?

If yes, use the same universal id from that call.

If no, use new call segment id as universal id.

Save the universal call id into shared memory for that track number.

At this point, call 2 is associated with resource xxx and yyy. Any call initiated from those two resources will be linked together.

Resource xxx terminates call 2. The association for call 2 is broken.

Resource xxx transfers call 1 to resource yyy.

Inter message is received by call 3, call segment id 125 is assigned.

Track number is used to fetch universal call id from shared memory if it exists.

Otherwise, use call segment id. The call linking is preserved through track number.

Call linking across different call distribution systems is different than call linking for the same call distribution system. For example, it is very difficult to associate resources across different call distribution systems. Also, there is a latency issue because messages may not arrive in the same amounts of time. Different call distribution systems may be located in different geographic areas, and therefore the arrival sequence cannot be predicted for messages for the same call among different call segments. An algorithm for call linking across different call distribution systems cannot rely on the arrival sequence of messages from different call segments on different call distribution systems.

One embodiment takes advantage of the fact that when a call is queued or transferred to a different call distribution system, the track number is preserved. A large shared memory on information server 112 is used as repository for universal call id and track number. A pair of track number and universal call id is organized and stored on a per node basis. When a call comes into system 100, it is checked against the shared memory to determine whether the universal id is already initialized. If it is already initialized, the universal id in the shared memory is used. If it is not initialized, a universal id is allocated into the share memory such that related call segments can access it later. In one embodiment, the algorithm for call linking across multiple call distribution systems is as follows.

Assume a network inter-queue scenario and two call distribution systems, node 1 and node 3, respectively.

Rinit message received by any data monitor. Call segment id is assigned to this call.

Is this track number is already in share memory?

If yes, use the universal call id from shared memory.

If not, put new call segment id into shared memory as the universal id for that track number.

Once the first call segment in a call distribution system is populated, all transfer within the same call distribution system will be linked properly using the same call distribution system linking method.

In one embodiment, the following kinds of calls are linked:

Local Transfer Calls

Agent Transfer

New Transaction

Network InterQueue

Remote Transfer

Agent Info Call

This is a call for which the agent started another call to talk with someone else but did not actually transfer the caller.

Tables 2–4 are examples of call transfers.

TABLE 2

Local Transfer (Incoming Call -> 200; 200 -> 300; Incoming Call -> 300)

| Event | call_id | Track_num | Track_node | Orig Resource | Dest Resource |
|---|---|---|---|---|---|
| rinit | 2000 | 1000 | 20 | Trunk 1 | — |
| connect | 2000 | — | — | Trunk 1 | 200 |
| init | 2009 | 1010 | 20 | 200 | — |
| inter | 2020 | 1000 | 20 | Trunk 1 | 300 |

All the events shown in Table 2 start new calls. The rinit and inter event calls can be linked via their track_node and track_num fields. The init event call can be linked by using the orig resource in this event and searching all of the calls in progress for which this resource is a part of. For instance, in the case shown, resource 200 is the destination resource of the first call. Therefore, these two calls are linked. Both the destination and origination must be checked. Resource 200 could have started an outgoing call.

TABLE 3

Network InterQueue
(call queued at three different call distribution systems)

| Event | call_id | Track_num | Track_node | Orig Resource | Dest Resource |
|---|---|---|---|---|---|
| rinit | 2000 | 1000 | 20 | Trunk 1 | — |
| rinit | 3002 | 1000 | 20 | Trunk 45 | — |
| rinit | 100 | 1000 | 20 | Trunk 1012 | — |

The calls shown are linked by using the track_num and track_node to link the calls. The track_node indicates to call distribution system from which the call originated.

TABLE 4

Agent Info (Outgoing call started by 200 -> Trunk 100, 200 -> 300)

| Event | call_id | Track_num | Track_node | Orig Resource | Dest Resource |
|---|---|---|---|---|---|
| init | 1 | 100 | 20 | Agent 200 | — |
| init | 10 | 112 | 20 | Agent 200 | — |

When agent 200 makes the outgoing call, an init event arrives. Searching to determine if agent 200 is on any other call reveals no call. Therefore, this is a new call segment. Now agent 200 calls 300. An init event arrives with 200 as the originator. A search for agent 200 would link the first call with the second call. No transfer took place.

Figure 4:
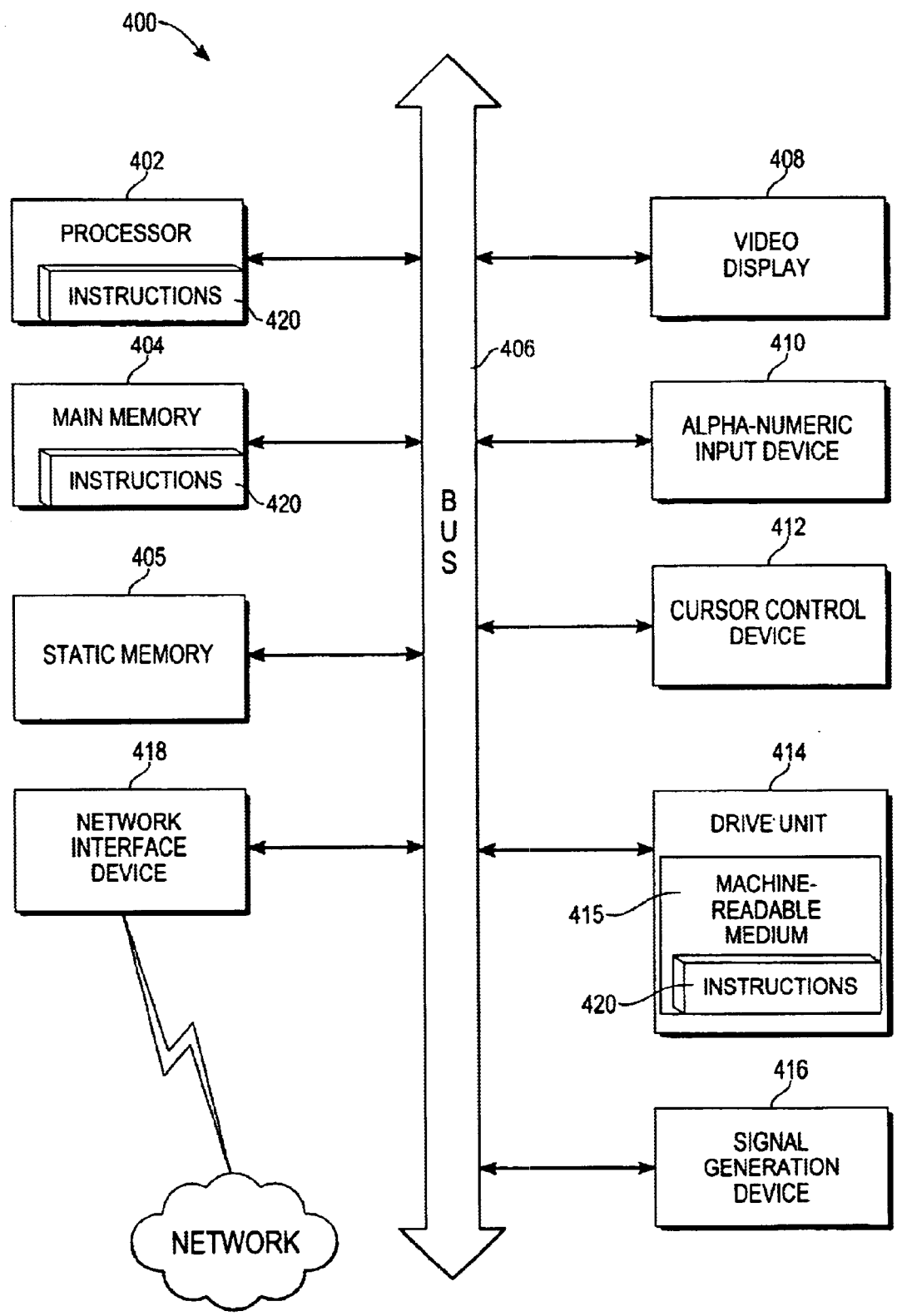
FIG. 4 is a block diagram illustrating an exemplary machine, the form of a computer system, within which a set of instructions for causing machine to perform any of the methodologies of the present invention may be executed.

FIG. 4 shows a diagrammatic representation of machine in the exemplary form of a computer system 400 within which a set of instructions, for causing the machine to perform any one of the methodologies discussed above, may be executed. The computer system 400 and includes a processor 402, a main memory 404 and a static memory 405, which communicate with each other via a bus 406. The computer system 400 is further shown to include a video display unit 408 (e.g., a liquid crystal display (LCD) or a cathode ray tube (CRT)). The computer system 400 also includes an alpha-numeric input device 410 (e.g. a keyboard), a cursor control device 412 (e.g. a mouse), a disk drive unit 414, a signal generation device 416 (e.g. a speaker) and a network interface device 418. The disk drive unit 414 includes a computer-readable medium 415 on which is stored a set of instructions (i.e., software) 420 embodying any one, or all, of the methodologies described above. The software 420 is also shown to reside, completely or at least partially, within the main memory 404 and/or within the processor 402. The software 420 may further be transmitted or received via the network interface device 418. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and apparatus for universal call identification have been described. Although the present invention has been described with reference to specific exemplary embodiments, it will be evident that various modifications and changes may be made to these embodiments without departing from the broader spirit and scope of the invention.

Accordingly, the specification and drawings are to be regarded in an illustrative rather than a restrictive sense.

What is claimed is:

1. A method for maintaining information about a call, comprising:

when the call is received from a caller at a call processing system, the call processing system including an information server and a plurality of automatic call distribution systems:

at the information server, creating a universal call identification for the call, wherein the call includes each of a plurality of call segments that occur between a first connection of the caller resource to the call processing system and a disconnection of the caller resource from the call processing system;

at the information server, creating a record of each of the plurality of call segments, at the information server, associating the universal call identification with each of the plurality call segments;

at the information server, storing the record of each of the plurality of call segments in a call segment table of the call processing system such that the record is accessible using the universal call identification; and at the information server, storing agent data, determined during the call, in an agent activity table, wherein the agent activity table is linked to the call segment table.

2. The method of claim 1, wherein the plurality of call segments comprises:

a hold call segment during which the caller is placed on hold.

3. The method of claim 1, further comprising associating a segment identification with each of the plurality of call segments.

4. The method of claim 1, further comprising linking the records in the call segment table to a plurality of dimension tables, wherein the plurality of dimension tables include dimension tables that store information comprising:

a business application involved in a call segment; and a call resource involved in the call segment.

5. The method of claim 4, wherein the information stored in the dimension tables further comprises:

a node involved in the call segment;

a call segment type;

a date of the call segment; and a time of the call segment.

6. The method of claim 1, further comprising:

maintaining agent activity table to indicate a type of agent state, including:

an idle state type;

a talk state type; and a hold state type.

7. The method of claim 5, further comprising:

maintaining a trunk activity table; and linking the trunk activity table to the call segment fact table.

8. The method of claim 7, wherein the trunk activity fact table comprises:

events for a trunk; and events for a trunk group.

9. A machine-readable medium storing a sequence of instructions that, when executed by a machine, cause the machine to perform the following operations within the context of a call processing system:

when a call is received from caller at the call processing system, wherein the call processing system includes an information server and a plurality of automatic call distribution systems, at the information server, creating a universal call identification for the call, wherein the call includes each of a plurality of call segments that occur between a first connection of a caller resource to the call processing system and a disconnection of the caller resource from the call processing system, wherein the plurality of call segments includes a conference call segment during which a first agent resource is connected to a second agent resource;

at the information server, creating a record for each of the plurality of call segments;

at the information server, associating the universal call identification with each of the plurality call segments;

at the information server, storing the record of each of the plurality of call segments in a call segment table of the call processing system such that the record is accessible using the universal call identification; and at the information server, storing agent data, determined during the call, in an agent activity fact table, wherein the agent activity fact table is linked to the call segment fact table.

* * * * *